(12) United States Patent
Muraki et al.

(10) Patent No.: US 9,626,396 B2
(45) Date of Patent: Apr. 18, 2017

(54) INFORMATION LOGGER

(71) Applicant: TOMY COMPANY, LTD., Katsushika-ku, Tokyo (JP)

(72) Inventors: Makoto Muraki, Tokyo (JP); Takeaki Maeda, Tokyo (JP)

(73) Assignee: TOMY COMPANY, LTD., Tokyo (JP)

( * ) Notice: Subject to any disclaimer, the term of this patent is extended or adjusted under 35 U.S.C. 154(b) by 55 days.

(21) Appl. No.: 14/758,773

(22) PCT Filed: Apr. 17, 2015

(86) PCT No.: PCT/JP2015/061799
§ 371 (c)(1),
(2) Date: Jun. 30, 2015

(87) PCT Pub. No.: WO2016/157546
PCT Pub. Date: Oct. 6, 2016

(65) Prior Publication Data
US 2016/0328426 A1 Nov. 10, 2016

(30) Foreign Application Priority Data

Mar. 31, 2015 (JP) .................................. 2015-072909

(51) Int. Cl.
*G06F 17/30* (2006.01)
*A63H 1/02* (2006.01)

(52) U.S. Cl.
CPC ......... *G06F 17/30312* (2013.01); *A63H 1/02* (2013.01)

(58) Field of Classification Search
CPC .......... A63H 1/00; A63H 1/02; A63H 17/008; A63H 1/18; G01P 3/00
See application file for complete search history.

(56) References Cited

U.S. PATENT DOCUMENTS 6,287,193 B1 * 9/2001 Rehkemper .............. A63H 1/30
273/142 H
6,739,939 B2 5/2004 Matsukawa
(Continued)

FOREIGN PATENT DOCUMENTS

JP 2002-219269 8/2002
JP 3400433 2/2003
(Continued)

OTHER PUBLICATIONS

J-Plat Pat Abstract, Publication No. 2002-219269, published Aug. 6, 2002 (corresponds to JP 3400433).
(Continued)

*Primary Examiner* — Jay Liddle
*Assistant Examiner* — Alex F. R. P. Rada, II
(74) *Attorney, Agent, or Firm* — Staas & Halsey LLP

(57) ABSTRACT

An information logger records rotation information on a spinning top and outputs the recorded information. A detachment detector detects that the spinning top is attached to the launcher. A rotation-rate detecting unit detects a rotation rate of the spinning top while a rotational force is applied to the spinning top. Rotation information of the spinning top derived from a result detected by a rotation-rate detecting unit is stored in a storage unit. The rotation information stored in the storage unit is sent to an information processor by a communication unit as required.

4 Claims, 5 Drawing Sheets

(56) References Cited

U.S. PATENT DOCUMENTS

| | | | |
|---|---|---|---|
| 6,905,389 B2 | 6/2005 | Matsukawa | |
| 7,594,843 B2* | 9/2009 | Vetuskey | A63H 17/006 446/39 |
| 2006/0160464 A1* | 7/2006 | Vetuskey | A63H 17/006 446/247 |
| 2008/0096460 A1* | 4/2008 | Sandoval | A63H 17/008 446/279 |
| 2010/0323582 A1* | 12/2010 | Sandoval | A63H 17/008 446/429 |
| 2012/0270472 A1* | 10/2012 | Sandoval | A63H 17/008 446/429 |
| 2014/0292810 A1* | 10/2014 | Tsurumi | G06T 11/00 345/633 |

FOREIGN PATENT DOCUMENTS

| | | |
|---|---|---|
| JP | 3532900 | 3/2004 |
| JP | 3612508 | 10/2004 |
| KR | 10-2015-0022267 | 3/2015 |

OTHER PUBLICATIONS

J-Plat Pat Abstract, Publication No. 2003-210841, published Jul. 29, 2003 (corresponds to JP 3532900).

J-Plat Pat Abstract, Publication No. 2003-103062, published Apr. 8, 2003 (corresponds to JP 3612508).

Matoba, et al., "An Entertainment System That Enhances the Experience of Playing with Tops," Information Processing Society of Japan, vol. 53, No. 3 (Mar. 2012), pp. 1110-1118 and bibliography (2 pp).

International Search Report in Application No. PCT/JP2015/061798 mailed Jun. 2, 2015.

Written Opinion of International Search Report in Application No. PCT/JP2015/061798 mailed Jun. 2, 2015.

International Search Report in Application No. PCT/JP2015/061799 mailed Jun. 2, 2015.

Written Opinion of International Search Report in Application No. PCT/JP2015/061799 mailed Jun. 2, 2015.

Espacenet English Abstract, Korean Publication No. 10-2015-0022267, Published Mar. 4, 2015.

Japanese Platform for Patent Information English Abstract, Japanese Publication No. 2002-219269, Published Aug. 6, 2002.

Extended European Search Report dated Mar. 1, 2016 in corresponding European Patent Application No. 15730038.5.

Notice of Allowance for U.S. Appl. No. 14/758,769, issued Jul. 14, 2016.

Application for copending U.S. Appl. No. 14/758,769, filed Jun. 30, 2015.

Preliminary Amendment for copending U.S. Appl. No. 14/758,769, filed Jun. 30, 2015.

* cited by examiner

FIG.5

| |
|---|
| IDENTIFICATION INFORMATION (ID) OF USER |
| NICKNAME (NK) OF USER |
| NUMBER OF SHOTS (ST) |
| ACCUMULATED ROTATION RATE (AR) |
| HIGHEST ROTATION RATE (MR1) |
| SECOND HIGHEST ROTATION RATE (MR2) |
| THIRD HIGHEST ROTATION RATE (MR3) |
| AVERAGE ROTATION RATE (PAV) |
| AVERAGE ROTATION RATE OF ALL USERS (WAV) |
| HIGHEST ROTATION RATE OF ALL USERS (WMX) |
| ⋮ |

INFORMATION LOGGER

CROSS-REFERENCE TO RELATED APPLICATIONS

This application claims the foreign priority benefit of Japanese Application No. 2015-072909, filed Mar. 31, 2015, the content of which is incorporated herein by reference, which serves as priority for PCT Application No. JP2015/061799, filed Apr. 17, 2015.

TECHNICAL FIELD

The present invention relates to information loggers, specifically an information logger that records rotation information of a spinning top during application of a rotational force by a launcher.

BACKGROUND ART

Techniques have been proposed for launchers that apply rotational forces to spinning tops so as to spin the spinning tops on game tables (for example, Patent Document 1, which hereinafter is referred to as "Conventional Example 1"). The technique according to Conventional Example 1 applies a rotational force to a spinning top by a pull operation of a rack belt of a launcher.

According to other proposed techniques, flywheels are spun by a pull operation of rack belts of launchers without application of rotational forces to real spinning tops, the spin of the fly wheels is detected, and the detected results are assigned as spin attributes of virtual electronic spinning tops (for example, Patent Document 2, which hereinafter referred to as "Conventional Example 2"). With the technique according to Conventional Example 2, players can enjoy "battles" between electronic spinning tops having spin attributes corresponding to the spin applied through the pull operation of the rack belts.

PRIOR ART DOCUMENT

Patent Document

Patent Document 1: Japanese Patent Application Laid-Open No.2003-103062
Patent Document 2: Japanese Patent No. 3532900

According to Conventional example 1, a player can actually feel the spin of the spinning top through manual operation (pull operation of a rack belt). Unfortunately, information on the spin of the spinning top resulting from the application of a rotational force is not stored. Thus, the results of playing with the spinning top using the launcher cannot be applied to other games, such as "battles" in a virtual space.

According to Conventional Example 2, a player can use an electronic spinning top assigned with an attribute corresponding to the rotational force applied by the player so as to enjoy a "battle" with another electronic spinning top in a virtual space. Unfortunately, the rotation attribute assigned to the electronic spinning top can only be used in a single "battle." Thus, the player cannot play with the spinning top in away that involves the skill level of launcher operation, for example. With the technique according to Conventional Example 2, the player cannot actually sense the spin of the spinning top being operated by the player.

SUMMARY OF INVENTION

An object of the present invention, which has been conceived in light of the circumstances described above, is to provide an information logger that records rotation information on a spinning top acquired through the operation of a launcher while a user actually senses the spin of the spinning top resulting from the operation of the launcher, and can output the recorded information as necessary.

The first embodiment is an information logger that records rotation information of a spinning top, including:
an attachment detachable from a launcher that applies a rotational force to the spinning top;
a rotation-rate detector that detects a rotation rate of the spinning top during application of the rotational force by the launcher to the spinning top;
a storage unit that stores the rotation information of the spinning top acquired based on the rotation rate detected by the rotation-rate detector; and
an output unit that outputs the rotation information stored in the storage unit.

The second embodiment is the information logger according to the first embodiment, further including a detachment detector that detects detachment and attachment of the spinning top from and to the launcher.

The third embodiment is the information logger according to the first or the second embodiment,
wherein the storage unit further stores identification information of a user, and
wherein information output from the output unit includes the identification information of a user.

The fourth embodiment is the information logger according to the first embodiment, further including a display unit that displays a level of intensity of a shooting force derived from the rotation rate of the spinning top detected by the rotation-rate detector.

According to the first embodiment, a rotation-rate detector detects the rotation rate of a spinning top attached to a launcher with an attachment while a rotational force is applied to the spinning top. The rotation information of the spinning top acquired from the result detected by the rotation-rate detector is stored in a storage unit. The rotation information stored in the storage unit is output from an output unit as required.

Thus, the rotation information on the spinning top acquired through the operation of the launcher is recorded while the user actually senses the spin of the spinning top resulting from the operation of the launcher, and the recorded information can be retrieved as necessary.

According to the second embodiment, a detachment detector detects detachment and attachment of the spinning top from and to the launcher. Thus, the detection by the rotation-rate detector can be started after the spinning top is attached to the launcher so as to effectively prevent erroneous detection by the rotation-rate detector.

According to the third embodiment, the storage unit stores identification information of a user, and the information output from the output unit contains the identification information of the user. Thus, the rotation information is linked to the user and stored in the storage unit. Even if the launcher is replaced with another one, the rotation information can be linked to the user and stored in the storage unit. When the rotation information is output from the output unit, the identification information on the user is sent together. Thus, even if the user uses different launchers to apply rotational forces to the spinning top, the rotation information items acquired through the application of the rotational forces can be integrated and output as information associated with the user.

According to the fourth embodiment, a display unit displays the level of intensity of a shooting force derived from the rotation rate of the spinning top detected by the rotation-rate detector. Thus, every time the user uses the launcher to apply a rotational force to the spinning top, the user can confirm the level of the rotational force applied to the spinning top.

BRIEF DESCRIPTION OF DRAWINGS

FIG. 5 illustrates example rotation information stored in the storage unit illustrated in FIG. 2.

DESCRIPTION OF EMBODIMENTS

Embodiments of a rotation-rate detector of a spinning top according to the present invention will now be described with reference to the accompanying drawings.

Figure 1:
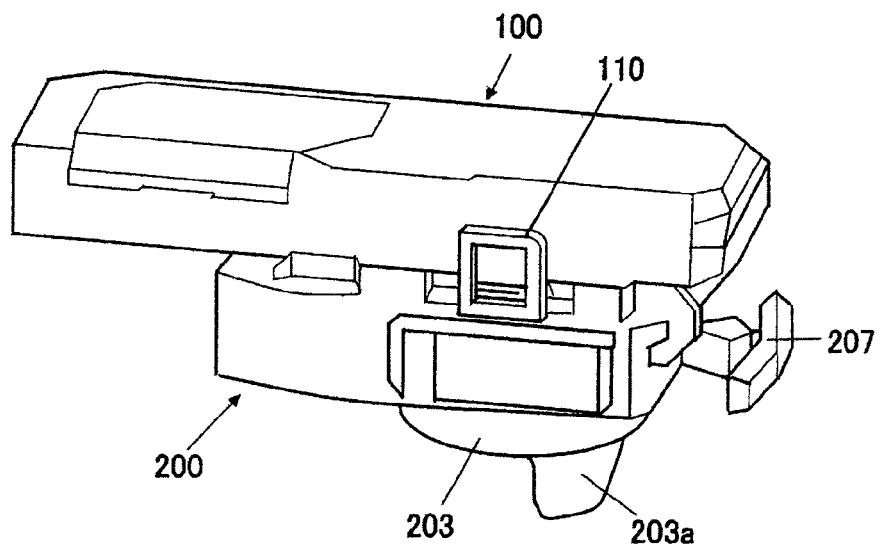
FIG. 1 is a perspective view of an information logger attached to a launcher according to the present invention.
Figure 2:
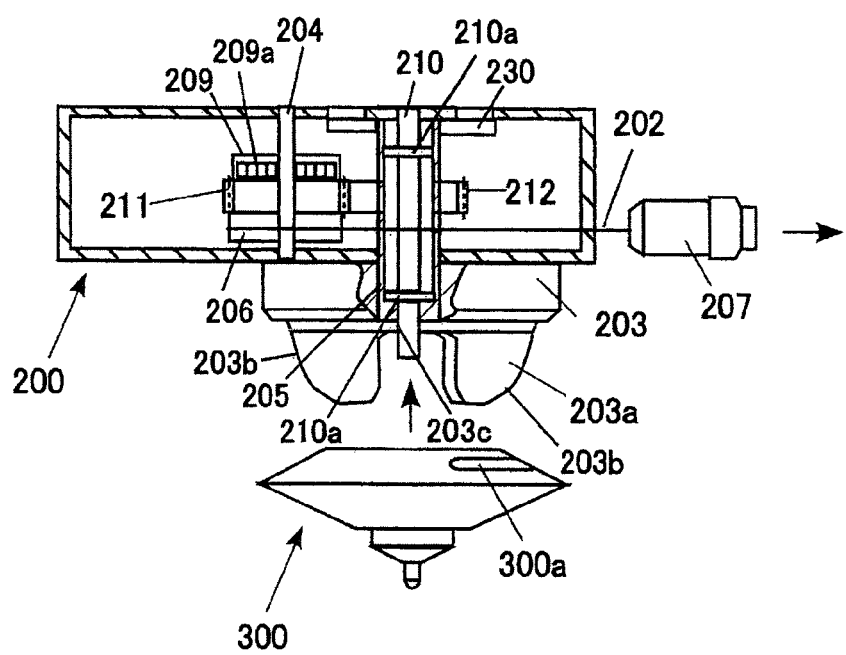
FIG. 2 is a schematic cross-sectional view of the launcher.

FIG. 1 is an external view of an information logger 100, which is configured as a rotation-rate detector according to an embodiment, attached to a launcher (shooter) 200. FIG. 2 is a schematic cross-sectional view of the launcher.

Configuration of Launcher 200

The launcher 200 will now be described. Pulling of a string 202 of the launcher 200 spins a spinning-top holder 203, and thereby applies a rotational force to a spinning top 300, which is coupled with the spinning-top holder 203.

With reference to FIG. 2, the launcher 200 includes shafts 204 and 205 disposed in parallel. The shaft 204 is a fixed shaft and supports a drum 206 around which the string 202 is wound. One end of the string 202 is fixed to the drum 206, and the other end of the string 202 is connected to a handle 207. A spiral spring 209a is wound around the shaft 204. One end of the spiral spring 209a is fixed to the shaft 204, and the other end is fixed to a spiral-spring case 209. The handle 207 is pulled against the urging force of the spiral spring 209a to spin the drum 206. The shaft 204 supports a toothed wheel 211. The toothed wheel 211 rotates together with the drum 206 as the handle 207 is pulled.

The shaft 205 is a rotary shaft and supports a toothed wheel 212. The toothed wheel 212 engages with the toothed wheel 211.

The shaft 205 is shaped as a cylinder and supports the spinning-top holder 203 at the bottom end of the shaft 205. The spinning-top holder 203 has two hooks 203a, which are fit in engagement holes 300a of the spinning top 300 to support the spinning top 300.

The pulling of the handle 207 spins the shaft 205 via the toothed wheels 211 and 212 and thereby spins the spinning-top holder 203.

The upper end of the shaft 205 supports a rotary body 230, which is described below.

The shaft 205 slidably accommodates a rod 210, which serves as an ejector of the spinning top 300. The rod 210 is unfixed and is pulled downward by a gravitational force. The rod 210 has flanges 210a. This prevents the rod 210 from falling out. The rod 210 extends downward through a hole 203c provided in the center of the spinning-top holder 203.

The rod 210 may be urged downward by a spring wound around the rod 210.

The hooks 203a of the spinning-top holder 203 of the launcher 200 having such a configuration is coupled with the spinning top 300. The handle 207 is pulled against the urging force of the spiral spring 209a to spin the drum 206 via the string 202, thereby spinning the toothed wheel 211. The spinning of the toothed wheel 211 is transmitted to the toothed wheel 212 to spin the shaft 205. This spins the spinning-top holder 203, and thereby swiftly spins the spinning top 300. Stopping the pulling of the handle 207 in this state stops the spinning of the spinning-top holder 203. The top 300 supported by the spinning-top holder 203 continues to spin by inertia and detaches from the spinning-top holder 203 along a tilting surface 203b of the hooks 203a of the spinning-top holder 203. Releasing the hand of the user from the handle 207 (completely releasing the pulling force) returns the launcher 200 to the initial state by the urging force of the spiral spring 209a. A one-way clutch is preferably provided in the power transmitting mechanism so as to prevent the spinning of the spinning-top holder 203 while returning to the initial state.

Configuration of Information Logger 100

The information logger 100 will now be described.

Figure 3:
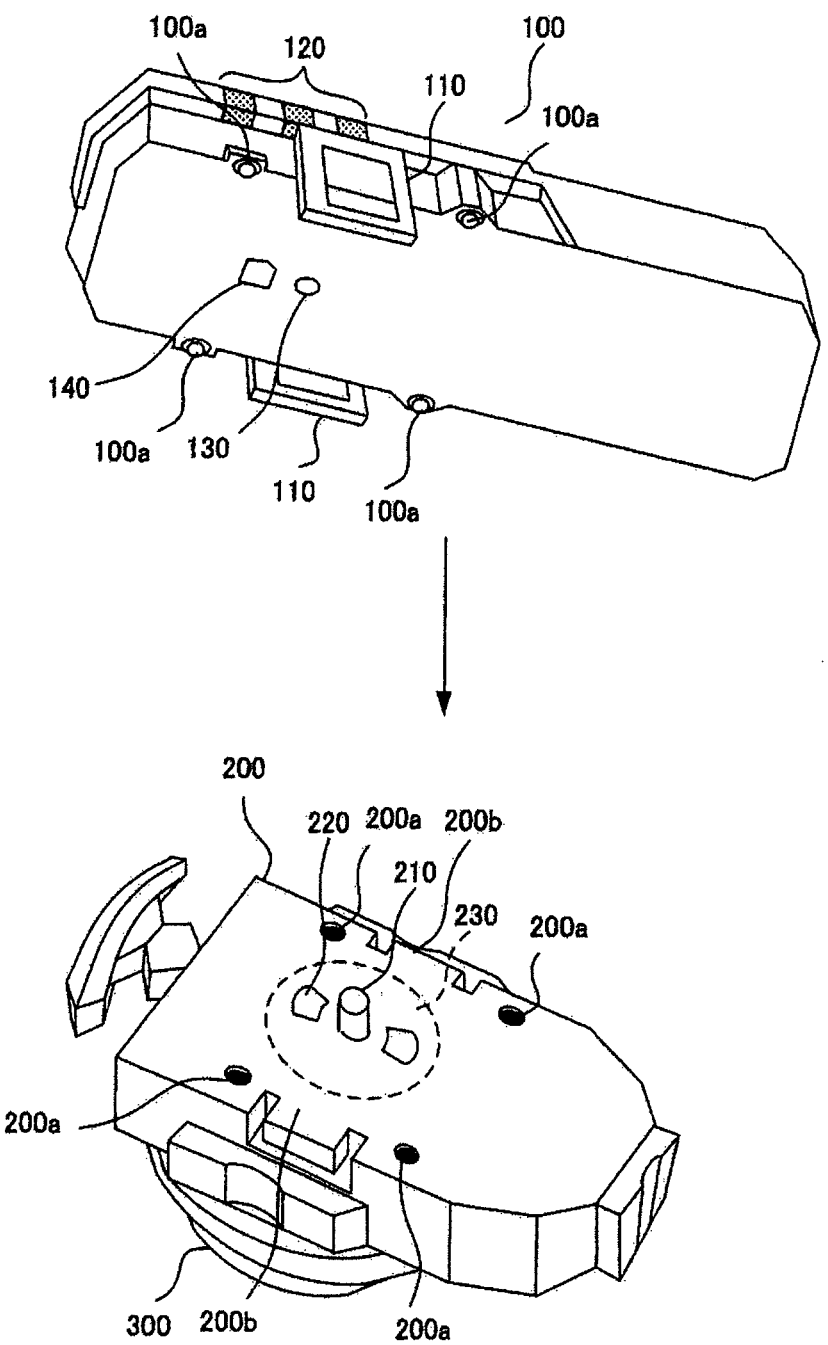
FIG. 3 is an external view of the information logger and the launcher in a separated state.

With reference to FIG. 3, the information logger 100 has four protrusions 100a for positioning and attachments 110 for attachment of the launcher 200. The four protrusions 100a are fit into the four depressions 200a of the launcher 200 for positioning. The attachments 110 are manually fit together with protrusions 200b of the launcher 200 to attach the information logger 100 to the launcher 200. The attachments 110 are manually detached from the launcher 200 to separate the information logger 100 and the launcher 200.

With reference to FIG. 3, the information logger 100 includes a display unit 120 on a side face. In this embodiment, the display unit 120 includes three LED (light emitting diode) lamps. The on/off patterns of the LED lamps indicate eight different levels of the rotational force (i.e., shooting force) applied to the spinning top 300, as described below. Alternatively, any other display scheme may be applied. For example, the number of LEDs and the control patterns thereof may be appropriately varied.

With reference to FIG. 3, a detachment detector 130 and a rotation-rate detecting unit 140 are disposed on the bottom surface of the information logger 100. The rotation-rate detecting unit 140 includes a counter 140a that counts the number of rotations of the spinning top 300 from the start of spinning to detachment, a clock 140b that measures the time from the start of the spinning to the detachment of the spinning top 300, and a calculator 140c that calculates the rotation rate from the counted number and the measured time. The rotation rate may be represented in any unit, for example, rpm. As an alternative or in addition to the rotation rate, which is the number of rotations per time, the actual number of rotations may be counted. This applies to the descriptions below, as well.

The rod 210 urged downward is disposed on the upper surface of the launcher 200, as described above. The rod 210 is pushed upward by the spinning top 300 when the spinning top 300 is attached to the launcher 200 and protrudes from the upper surface of the launcher 200. The detachment detector 130 opposes the rod 210 when the information logger 100 is attached to the launcher 200. The detachment detector 130 detects the urging by the rod 210 protruding from the upper surface of the launcher 200 attached to the spinning top 300 so as to detect the attachment of the spinning top 300 to the launcher 200. The detachment detector 130 is, for example, a detecting switch that detects the urging of the rod 210.

With reference to FIG. 3, openings 220 are provided in the upper surface of the launcher 200. When the spinning top 300 is attached to the launcher 200, the upper surface of the rotary body 230 in the launcher 200 is visible from above through the openings 220. The rotary body 230 spins together with the spinning top 300 rotationally driven by the launcher 200. In this embodiment, the upper surface of the rotary body 230 has multiple sectoral regions, which have an identical central angle and are alternatively colored in black and white along the circumferential direction. While a rotational force is applied to the spinning top 300 by the launcher 200, the color of the upper surface of the rotary body 230 viewed from above through the openings 220 cyclically switches between black and white. The shape and the colors may be any other ones that cyclically switch between different reflectances or materials, for example.

The rotation-rate detecting unit 140 opposes the openings 220 when the information logger 100 is attached to the launcher 200. The rotation-rate detector 140 detects the rotation rate of the spinning top 300 through detection of the cycle of the color switching of the upper surface regions of the rotary body 230 viewed through the openings 220.

Figure 4:
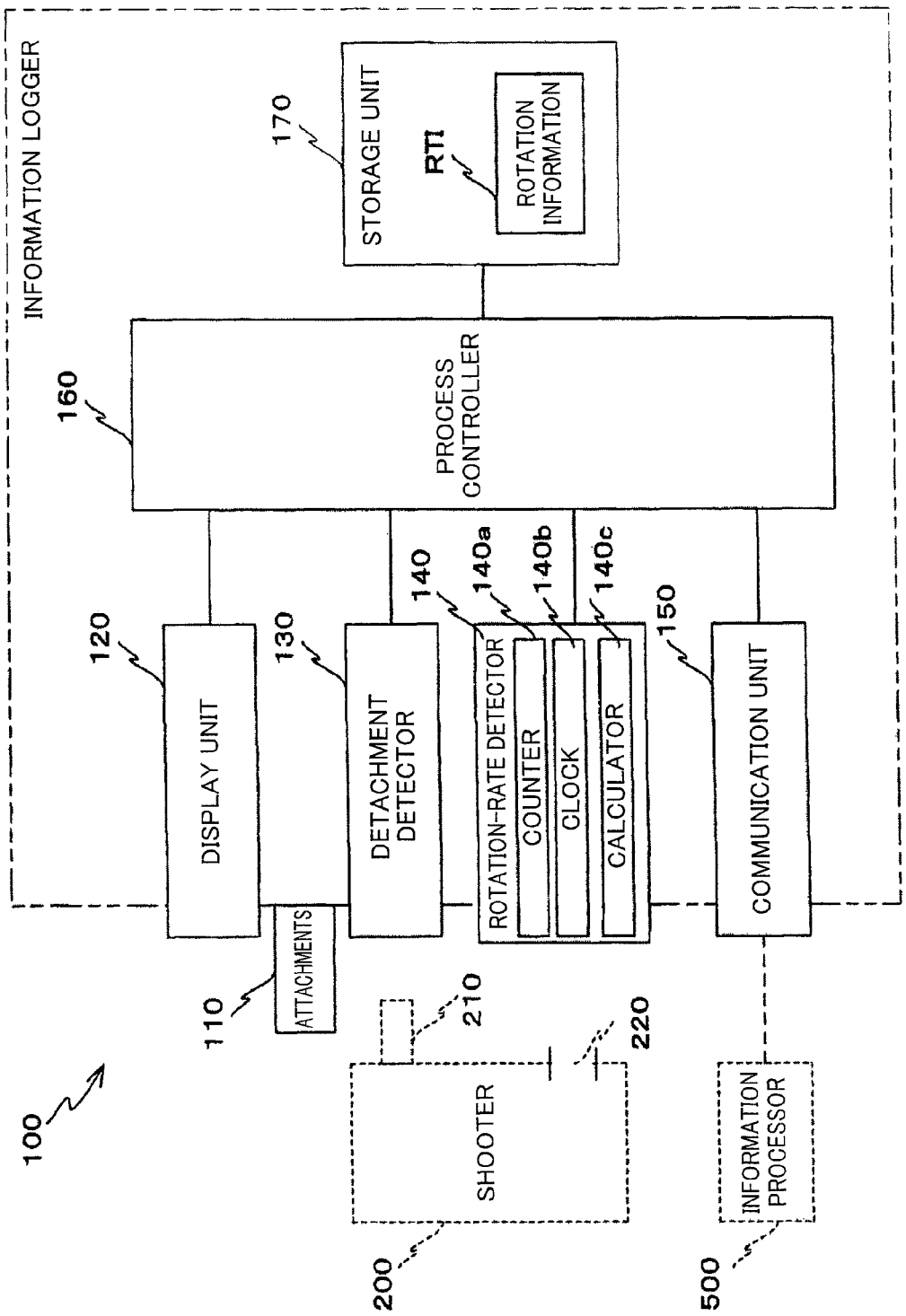
FIG. 4 is a schematic block diagram illustrating the information logger in FIG. 1.

With reference to FIG. 4, the information logger 100 includes the attachments 110, the display unit 120, the detachment detector 130, and the rotation-rate detecting unit 140, which are described above, and further include a communication unit 150, a process controller 160, and a storage unit 170. The display unit 120, the detachment detector 130, the rotation-rate detecting unit 140, the communication unit 150, and the storage unit 170 are connected to the process controller 160.

The display unit 120 receives an instruction for a display pattern from the process controller 160. The display unit 120 appropriately turns on or off the three LED lamps in accordance with the instruction for the display pattern.

The detachment detector 130 detects the urging of the rod 210 of the launcher 200, as described above. The results detected by the detachment detector 130 are sent to the process controller 160. The results are then sent from the process controller 160 to the rotation-rate detecting unit 140, as required.

The rotation-rate detecting unit 140 detects the rotation rate of the spinning top 300 attached to the launcher 200, as described above. The results detected by the rotation-rate detecting unit 140 are sent to the process controller 160.

In this embodiment, the rotation-rate detecting unit 140 includes a light source that emits light toward the openings 220 of the attached launcher 200 and a light-intensity detector that detects the intensity of the incident light. The rotation-rate detecting unit 140 detects the cycle of the intensity variation in the incident light, which is emitted from the light source and reflected at the upper surface of the rotary body 230, so as to detect the cycle of the color variation in the regions on the upper-surface of the rotary body 230 irradiated with the light emitted from the light source, which leads to the detection of the rotation rate of the spinning top 300.

The communication unit 150 (output unit) transmits data signals to and from an information processor 500. In this embodiment, the information processor 500 is assumed to be a smart phone that includes an earphone/microphone terminal through which data communication can be established.

The communication unit 150 includes a cable having a terminal electrically connectible to the earphone/microphone terminal. The cable is stored inside the information logger 100 when communication is not established with the information processor 500.

The communication unit 150 receives the data sent from the process controller 160 and generates a signal appropriate for communication of the transmitted data. The communication unit 150 sends the generated signal to the information processor 500. Alternatively, the communication unit 150 receives the data sent from the information processor 500 and generates a signal representing the received data and conforming to the data format for the process controller 160. The communication unit 150 sends the generated signal to the process controller 160.

The process controller 160 comprehensively controls the operation of the information logger 100 and carries out a process based on the rotation rate detected by the rotation-rate detecting unit 140. In this embodiment, the process controller 160 includes a CPU (central processing unit) and other units and carries out various processes through execution of programs stored in the storage unit 170.

The processes carried out by the process controller 160 will be described below.

The storage unit 170 includes a non-volatile storage device. The storage unit 170 stores various types of information required by the process controller 160. Such information contains programs executed by the process controller 160 and rotation information RTI.

With reference to FIG. 5, the rotation information RTI contains identification information (ID) of the user and a nickname (NK) of the user. The rotation information RTI also contains the number of shots (ST), the accumulated rotation rate (AR), the highest rotation rate (MR1), the second highest rotation rate (MR2), the third highest rotation rate (MR3), and the average rotation rate (PAV). The rotation information RTI also contains the average rotation rate of all users (WAV) and the highest rotation rate of all users (WMX).

The identification information of the user is assigned by a management server that manages other information on loggers similar to the information logger 100 and is sent to the process controller 160 via the information processor 500. The process controller 160 registers this identification information as the identification information (ID) of the user in the storage unit 170.

The nickname of the user is input to the information processor 500 by the user. The information processor 500 sends the input nickname of the user to the information logger 100. The process controller 160 receives the nickname of the user from the information processor 500 via the communication unit 150 and registers this nickname of the user as the nickname (NK) of the user to the storage unit 170.

The process controller 160 recalculates the values of the number of shots, the accumulated rotation rate, the highest rotation rate, the second highest rotation rate, the third highest rotation rate, and the average rotation rate every time a rotational force is applied to the spinning top 300 (this operation is referred to as a shot) by the launcher 200. The process controller 160 updates the number of shots (ST), the accumulated rotation rate (AR), the highest rotation rate (MR1), the second highest rotation rate (MR2), the third highest rotation rate (MR3), and the average rotation rate (PAV) in the storage unit 170 using the recalculated values.

The average rotation rate of all users and the highest rotation rate of all users are sent from the management server to the process controller 160 via the information processor 500. The process controller 160 registers the average rotation rate of all users and the highest rotation rate of all users as the average rotation rate of all users (WAV) and the highest rotation rate of all users (WMX) in the storage unit 170.

Operation

The operation of the information logger 100 having a configuration such as that described above will now be described with focus on the processes carried out by the process controller 160. Current information is registered to the rotation information RTI in the storage unit 170. In an initial state, the information logger 100 is attached to the launcher 200.

Figure 6:
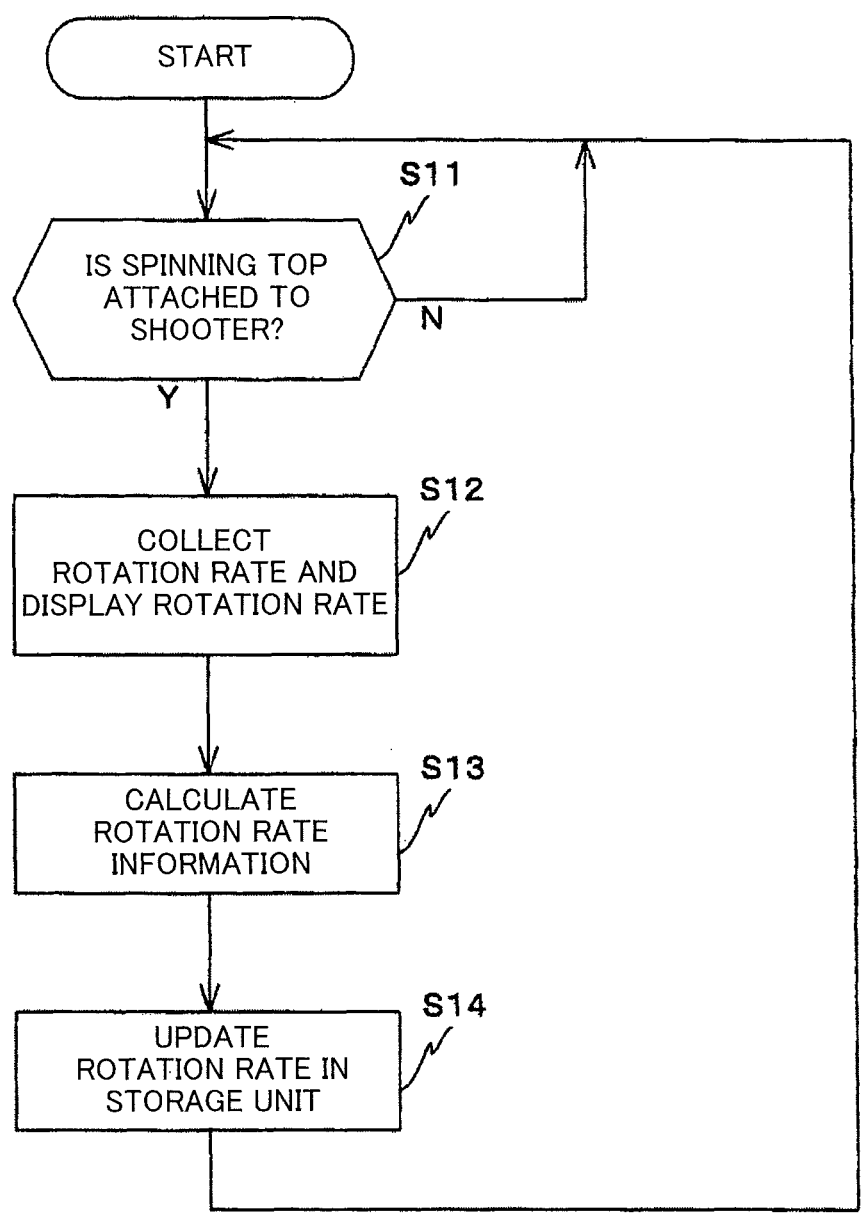
FIG. 6 illustrates a logging process of rotation information carried out by a process controller illustrated in FIG. 2.

With reference to FIG. 6, in Step S11, the process controller 160 in the initial state determines whether the spinning top 300 is attached to the launcher 200 on the basis of the result detected by the detachment detector 130. If the determined result in Step S11 is negative (N in Step S11), Step S11 is repeated.

If the spinning top 300 is attached to the launcher 200 and thus the determined result in Step S11 is positive (Y in Step S11), the process goes to Step S12. In Step S12, the process controller 160 collects the detected result by the rotation-rate detecting unit 140 and displays the rotation rate. The process controller 160 collects the detected rotation rate sent from the rotation-rate detecting unit 140 and generates an instruction for a display pattern corresponding to the collected rotation rate. The process controller 160 sends the generated instruction for the display pattern to the display unit 120. As a result, the display unit 120 appropriately turns on or off the three LED lamps in accordance with the instruction for the display pattern. The user can determine the level of the rotation rate of the spinning top 300 by viewing the display unit 120.

In Step S12, the collection of the result detected by the rotation-rate detecting unit 140 and the display of the rotation rate are continuously carried out until the detachment detector 130 detects the detachment of the spinning top 300 from the launcher 200 on the basis of the result detected by the detachment detector 130. After the detachment of the spinning top 300 from the launcher 200 is detected, Step S12 ends and the process goes to Step S13.

In Step S13, the process controller 160 calculates the updated values of the number of shots, the accumulated rotation rate, the highest rotation rate, the second highest rotation rate, the third highest rotation rate, and the average rotation rate based on the rotation rate collected in Step S12 and the respective current values of the number of shots (ST), the accumulated rotation rate (AR), the highest rotation rate (MR1), the second highest rotation rate (MR2), the third highest rotation rate (MR3), and the average rotation rate (PAV) in the rotation information RTI in the storage unit 170.

Specifically, the process controller 160 calculates (ST+1) as the updated number of shots. The process controller 160 calculates (AR+(newly collected rotation rate)) as the updated accumulated rotation rate.

The process controller 160 updates the highest rotation rate, the second highest rotation rate, and the third highest rotation rate in accordance with the newly collected rotation rate. If the newly collected rotation rate is smaller than or equal to the current third highest rotation rate (MR3), the highest rotation rate, the second highest rotation rate, and the third highest rotation rate are not updated.

The process controller 160 divides the updated accumulated rotation rate with the updated number of shots to obtain the updated average rotation rate.

After the number of shots, the accumulated rotation rate, the highest rotation rate, the second highest rotation rate, the third highest rotation rate, and the average rotation rate are recalculated as described above, the number of shots (ST), the accumulated rotation rate (AR), the highest rotation rate (MR1), the second highest rotation rate (MR2), the third highest rotation rate (MR3), and the average rotation rate (PAV) in the rotation information RTI in the storage unit 170 are updated with the respective recalculated values in Step S14.

After the updating in Step S14, the process returns to Step S11. Steps S11 to S14 are then repeated.

The rotation information RTI updated as described above is sent to the information processor 500 in response to a reading request from the information processor 500. The reading request is issued when a user inputs an instruction for reading to the information processor 500.

Upon reception of the rotation information RTI from the information logger 100, the information processor 500 displays the received content on the display unit of the information processor 500. In this way, the user can determine the current rotation information RTI.

Upon reception of a request input by a user for transmission of the rotation information to a management server, the information processor 500 sends the identification information (ID) of the user, the nickname (NK) of the user, the number of shots (ST), the accumulated rotation rate (AR), the highest rotation rate (MR1), the second highest rotation rate (MR2), the third highest rotation rate (MR3), and the average rotation rate (PAV) received from the information logger 100 to the management server. The nickname (NK) of the user, the number of shots (ST), the accumulated rotation rate (AR), the highest rotation rate (MR1), the second highest rotation rate (MR2), the third highest rotation rate (MR3), and the average rotation rate (PAV) are linked to the identification information (ID) of the user and registered to the management server.

The management server updates the average rotation rate of all users and the highest rotation rate of all users in response to a new registration or an update of the registered content. The management server sends the updated average rotation rate of all users and the updated highest rotation rate of all users to the information logger 100 via the information processor 500. This updates the average rotation rate of all users (WAV) and the highest rotation rate of all users (WMX) in the rotation information RTI in the storage unit 170.

According to the embodiment described above, the rotation-rate detecting unit 140 detects the rotation rate of the spinning top 300 while a rotational force is applied to the spinning top attached to the launcher 200 with the attachments 110. The rotation information of the spinning top 300 derived from the result detected by the rotation-rate detecting unit 140 is stored in the storage unit 170. The rotation information RTI stored in the storage unit 170 is sent from the communication unit 150 as required.

According to this embodiment, the rotation information on the spinning top 300 acquired through the operation of the launcher 200 is recorded while the user actually senses the spinning of the spinning top 300 resulting from the operation of the launcher 200, and the recorded information can be retrieved as necessary.

According to this embodiment, the detachment detector 130 detects that the spinning top 300 is attached to the launcher 200. Thus, the detection by the rotation-rate detecting unit 140 can be started after the spinning top 300 is attached to the launcher 200 so as to effectively prevent erroneous detection by the rotation-rate detecting unit 140.

According to this embodiment, the identification information (ID) of the user is stored in the storage unit 170 and is also included in the information sent from the communication unit 150. Thus, the rotation information is linked to the individual user and stored in the storage unit 170. Even if the launcher 200 is replaced with another one, the rotation information can be linked to the individual user and stored in the storage unit 170. When the rotation information is sent from the communication unit 150, the identification information (ID) of the user is sent together. Thus, even if the user uses different launchers to apply rotational forces to the spinning top, the rotation information items acquired through the application of the rotational forces can be integrated and output as information associated with the individual user.

According to this embodiment, the display unit 120 displays the level of the intensity of the shooting force derived from the rotation rate of the spinning top 300 detected by the rotation-rate detecting unit 140. Thus, every time the user uses the launcher 200 to apply a rotational force to the spinning top 300, the user can confirm the level of the rotational force applied to the spinning top.

The present invention should not be limited to the embodiments described above and may be modified in various ways without departing from the scope of the invention.

For example, the detachment detector may be a power switch of the information logger.

The rotation information may contain, for example, the number of shots, points assigned by the management server in accordance with the achieved rotation rate, and passwords for preventing improper update of the rotation information via unauthorized communication.

In place of or in addition to communication via an earphone according to the embodiment described above, the communication unit may establish communication via another scheme, such as an infrared communication scheme.

The communication partner via the communication unit may include another information logger so as to exchange identification information on friends.

The detachment detector should not be limited to a detection switch for detection of the movement of the rod 210 and may alternatively be a detector that optically or electromagnetically detects the detachment or attachment of the spinning top 300.

The present invention can be suitably applied to the manufacturing of information loggers.

The invention claimed is:

1. An information logger that records rotation information of a spinning top, comprising:
    an attachment on the logger that detachably attaches a separate launcher that includes a rotational mechanism and that applies a rotational force to the spinning top;
    a rotation-rate detector that detects a rotation rate of the spinning top during application of the rotational force by the launcher to the spinning top;
    a storage unit that stores the rotation information of the spinning top acquired based on a result detected by the rotation-rate detector; and
    an output unit that outputs the rotation information stored in the storage unit.

2. The information logger according to claim 1, further comprising a detachment detector that detects detachment and attachment of the spinning top from and to the launcher.

3. The information logger according to claim 1,
    wherein the storage unit further stores identification information of a user, and
    wherein information output from the output unit comprises the identification information of a user.

4. The information logger according to claim 1, further comprising a display unit that displays a level of intensity of a shooting force derived from the rotation rate of the spinning top detected by the rotation-rate detector.

\* \* \* \* \*